US012785609B2

(12) United States Patent
Li et al.

(10) Patent No.: US 12,785,609 B2
(45) Date of Patent: Nov. 3, 2026

(54) ACTIVE HEATING METHOD FOR ELECTRIC MOTOR, APPARATUS, DEVICE, STORAGE MEDIUM AND PROGRAM PRODUCT

(71) Applicants: Viridi E-Mobility Technology (Ningbo) Co., Ltd., Zhejiang (CN); ZEEKR Automobile (Ningbo Hangzhou Bay New Zone) Co., Ltd., Zhejiang (CN); Zhejiang Geely Holding Group Co., LTD., Zhejiang (CN)

(72) Inventors: Mingfu Li, Zhejiang (CN); Xunjin Xu, Zhejiang (CN); Yunhui Zhang, Zhejiang (CN)

(73) Assignees: Viridi E-Mobility Technology (Ningbo) Co., Ltd., Zhejiang (CN); ZEEKR Automation (Ningbo Hangzhou Bay New Zone) Co., Ltd., Zhejiang (CN); Zhejiang Geely Holding Group Co., LTD., Zhejiang (CN)

( * ) Notice: Subject to any disclaimer, the term of this patent is extended or adjusted under 35 U.S.C. 154(b) by 245 days.

(21) Appl. No.: 18/718,798

(22) PCT Filed: Mar. 13, 2023

(86) PCT No.: PCT/CN2023/081045

§ 371 (c)(1),
(2) Date: Jun. 11, 2024

(87) PCT Pub. No.: WO2023/174202

PCT Pub. Date: Sep. 21, 2023

(65) Prior Publication Data

US 2025/0055402 A1 Feb. 13, 2025

(30) Foreign Application Priority Data

Mar. 17, 2022 (CN) ......................... 202210264853.0

(51) Int. Cl.
*H02P 29/62* (2016.01)
*B60L 58/27* (2019.01)

(52) U.S. Cl.
CPC .............. *H02P 29/62* (2016.02); *B60L 58/27* (2019.02); *B60L 2240/425* (2013.01)

(58) Field of Classification Search
CPC .............. F25B 49/025; F25B 2600/021; F25B 2600/024; F25B 2700/151; F25B 2400/01;

(Continued)

(56) References Cited

U.S. PATENT DOCUMENTS

| | | | |
|---|---|---|---|
| 2008/0143281 | A1 | 6/2008 | Yaguchi |
| 2010/0050676 | A1 | 3/2010 | Takamatsu et al. |

(Continued)

FOREIGN PATENT DOCUMENTS

| | | |
|---|---|---|
| CN | 101223685 | 7/2008 |
| CN | 107623479 | 1/2018 |

(Continued)

OTHER PUBLICATIONS

"Decision to Grant a Patent of Japan Counterpart Application", issued on Nov. 27, 2025, with English translation thereof, p. 1-p. 5.

(Continued)

*Primary Examiner* — Antony M Paul
(74) *Attorney, Agent, or Firm* — JCIPRNET

(57) ABSTRACT

An active heating method for an electric motor, an apparatus, a device, a storage medium and a program product. The method includes: receiving a heating instruction sent by a heat management system, where the heating instruction (Continued)

includes a heating power; inputting a current to the electric motor and adjusting a phase of three-phase pulses according to the heating power; continuously detecting an electric motor iron loss power, determining a difference between the electric motor iron loss power and the heating power, and adjusting a phase difference of the three-phase pulses according to the difference between the electric motor iron loss power and the heating power until the difference between the electric motor iron loss power and the heating power is less than a preset value, to realize active heating of the electric motor.

10 Claims, 8 Drawing Sheets

(58) Field of Classification Search
CPC ........ F25B 13/00; F25B 30/02; F25B 49/022; F25B 2313/003; F25B 2500/19; F25B 2500/27; F25B 2700/2115; F25B 31/02; F25B 2700/171; H02P 29/62; H02P 29/64; H02P 29/60; H02P 23/14; H02P 31/00; H02P 29/68; H02P 2101/45; H02P 27/06; H02P 27/08; H02M 3/156; H02M 5/458; B60L 2240/425; B60L 58/27; B60L 2240/429; B60L 2240/441; B60L 2240/486; B60L 50/61; B60L 15/20; F04B 39/06; F04B 35/04; G01K 7/42; G01N 25/00; G01R 31/343; G06F 2119/08; G06F 30/20; H02K 11/25; B60H 1/3222; B60H 1/00907; F04C 29/04; F04C 2270/10; F04C 29/045; F24F 11/85; F24F 2110/12; F24F 1/20; H02H 6/005; Y02T 10/70; Y02T 10/72; B60Y 2200/91
See application file for complete search history.

(56) References Cited

U.S. PATENT DOCUMENTS

| | | | | |
|---|---|---|---|---|
| 2013/0269370 | A1 * | 10/2013 | Hatakeyama | F25B 49/025 62/324.1 |
| 2022/0069755 | A1 | 3/2022 | Lee et al. | |

FOREIGN PATENT DOCUMENTS

| | | |
|---|---|---|
| CN | 110015196 | 7/2019 |
| CN | 209472083 | 10/2019 |
| CN | 111347935 | 6/2020 |
| CN | 111347938 | 6/2020 |
| CN | 111354999 | 6/2020 |
| CN | 111355429 | 6/2020 |
| CN | 111993901 | 11/2020 |
| CN | 112297868 | 2/2021 |
| CN | 112550078 | 3/2021 |
| CN | 112644339 | 4/2021 |
| CN | 113014170 | 6/2021 |
| CN | 113022262 | 6/2021 |
| CN | 113022326 | 6/2021 |
| CN | 113474973 | 10/2021 |
| CN | 113691193 | 11/2021 |
| CN | 113858966 | 12/2021 |
| CN | 114080751 | 2/2022 |
| CN | 114096435 | 2/2022 |
| CN | 114604103 | 6/2022 |
| DE | 19649710 | 6/1998 |
| JP | 2006250449 | 9/2006 |
| JP | 2010195081 | 9/2010 |
| JP | 2012082996 | 4/2012 |
| KR | 20220007729 | 1/2022 |
| WO | 2012147192 | 11/2012 |
| WO | 2014188566 | 11/2014 |
| WO | 2015118678 | 8/2015 |
| WO | 2021237990 | 12/2021 |

OTHER PUBLICATIONS

"Request for the Submission of an Opinion of Korea Counterpart Application", issued on Aug. 28, 2025, with English translation thereof, p. 1-p. 17.
Chen, Peng, "Application of Electromagnetic Induction Heating Technology in Packaging Engineering," Science and Technology, with English abstract, Mar. 2015, pp. 1-3.
Tang, Shuangqing; et al., "Key Technology and Prospects on the Electric Vehicles," Mechanical Science and Technology, vol. 22, No. 2, with English abstract, Mar. 2003, pp. 1-5.
Zhu, Yuan; et al., "Approximate calculation of electric-vehicle inverter power-loss in two control strategies," J Automotive Safety and Energy, vol. 4, No. 1, with English abstract, Mar. 2013, pp. 1-6.
"International Search Report (Form PCT/ISA/210) of PCT/CN2023/081045," mailed on Jun. 16, 2023, with English translation thereof, pp. 1-7.
"Written Opinion of the International Searching Authority (Form PCT/ISA/237) of PCT/ CN2023/081045," mailed on Jun. 16, 2023, with English translation thereof, pp. 1-8.
"Office Action of China Counterpart Application," issue on Nov. 8, 2023, with English translation thereof, pp. 1-21.
"Notice of Allowance of China Counterpart Application," issued on Jan. 4, 2024, with English translation thereof, pp. 1-7.
"Notice of Allowance of Korea Counterpart Application", issued on Apr. 7, 2026, with English translation thereof, p. 1- p. 11.

* cited by examiner

ACTIVE HEATING METHOD FOR ELECTRIC MOTOR, APPARATUS, DEVICE, STORAGE MEDIUM AND PROGRAM PRODUCT

CROSS-REFERENCE TO RELATED APPLICATION

This application is a national stage of International Application No. PCT/CN2023/081045, filed on Mar. 13, 2023, which claims priority to Chinese Patent Application No. 202210264853.0, filed on Mar. 17, 2022. Both of the aforementioned applications are hereby incorporated by reference in their entireties.

TECHNICAL FIELD

The present application relates to the field of electric vehicles and, in particular, to an active heating method for an electric motor, an apparatus, a device, a storage medium and a program product.

BACKGROUND

At present, electric vehicle technology is developing rapidly, and electric vehicles are gradually replacing traditional fuel vehicles. However, development of the electric vehicles is also facing many difficulties now. For example, in winter, battery performance of the electric vehicles will decline due to low temperature. Active heating of batteries is one of important means to improve the battery performance.

At present, active heating of a battery in the related art is usually to increase a copper loss of an electric motor by changing a duty cycle of one of three-phase currents of the electric motor, so as to realize heating of the electric motor, and then to transfer heat of the electric motor to the battery to realize heating up of the battery, achieving a purpose of improving the battery performance.

However, the inventors have found that there is at least the following technical problem in the related art: the heating of the electric motor is realized by increasing the duty cycle, which has low heating efficiency, resulting in slow heating up of the battery.

SUMMARY

The present application provides an active heating method for an electric motor, an apparatus, a device, a storage medium and a program product, which are used to solve the problem of slow heating up of a battery and increase speed of heating up of the electric motor.

In a first aspect, the present application provides an active heating method for an electric motor, including:

- receiving a heating instruction sent by a heat management system, where the heating instruction includes a heating power;
- inputting a current to the electric motor and adjusting a phase of three-phase pulses according to the heating power;
- continuously detecting an electric motor iron loss power, determining a difference between the electric motor iron loss power and the heating power, and adjusting a phase difference of the three-phase pulses according to the difference between the electric motor iron loss power and the heating power until the difference between the electric motor iron loss power and the heating power is less than a preset value, to enable the electric motor to be actively heated.

Based on the above technical content, after receiving the heating instruction, the phase of the three-phase pulses of the electric motor is changed, which can achieve the purpose of increasing the electric motor iron loss to heat the electric motor. After changing the phase of the three-phase pulses, the determination of whether the difference between the obtained iron loss power and the heating power contained in the heating instruction meets the requirement is continued, so as to continue to adjust the phase difference, which achieves the effect of enabling the iron loss power of the electric motor to be close to the heating power, continuously improving the heating efficiency of the electric motor and thus improving the speed of heating up of the battery.

In a possible implementation, inputting the current to the electric motor and adjusting the phase of the three-phase pulses according to the heating power includes: inputting the current with a preset magnitude to the electric motor, and looking up a corresponding phase difference in a preset first comparison table according to the heating power, where the preset first comparison table includes a correspondence between a heating power and a phase difference; adjusting the phase of the three-phase pulses using the corresponding phase difference.

Further, by looking up the phase difference corresponding to the heating power in the first comparison table, the phase difference close to or equal to the heating power is directly obtained, which reduces the time for subsequently adjusting the phase multiple times due to the insufficient iron loss power.

In a possible implementation, detecting the electric motor iron loss power includes: measuring an inlet-outlet temperature difference and a coolant flow rate of an electric drive system coolant, and determining the electric motor iron loss power according to the inlet-outlet temperature difference and the coolant flow rate.

Further, the electric motor iron loss power is determined by the inlet-outlet temperature difference and the coolant flow rate of the electric drive system coolant that are obtained by measurement, which facilitates the phase adjustment.

In a possible implementation, a calculation formula for determining the electric motor iron loss power according to the inlet-outlet temperature difference and the coolant flow rate is as follows:

$$P = C \cdot D \cdot F \cdot \Delta T \cdot A$$

where P is the electric motor iron loss power, C is a coolant specific heat capacity, D is a coolant density, F is the coolant flow rate, ΔT is the inlet-outlet temperature difference, and A is a constant.

Further, the electric motor iron loss power is calculated by the coolant specific heat capacity, the coolant density, the coolant flow rate, the inlet-outlet temperature difference and the constant, which facilitates the phase adjustment and increases the active heating speed of the electric motor.

In a possible implementation, after adjusting the phase difference of the three-phase pulses, the method further includes: if the phase difference of the three-phase pulses reaches a maximum value, and the difference between the electric motor iron loss power and the heating power is greater than the preset value, continuously detecting the electric motor iron loss power and increasing a current value until the difference between the electric motor iron loss power and the heating power is less than the preset value.

Further, the current is increased in a case that the phase difference reaches the maximum value and that the electric motor iron loss power does not reach the heating power and the difference between the electric motor iron loss power and the heating power is large, which achieves the effect of further increasing the heating efficiency of the electric motor.

In a possible implementation, the inputting the current to the electric motor and adjusting the phase of three-phase pulses according to the heating power specifically includes: determining a current value of each phase of the three-phase pulses according to the heating power; changing a duty cycle of at least one phase of the three-phase pulses to increase a copper loss; measuring an actual copper loss power, and adjusting the phase of the three-phase pulses according to the actual copper loss power and the heating power to increase an iron loss; the continuously detecting the electric motor iron loss power, determining the difference between the electric motor iron loss power and the heating power, and adjusting the phase difference of the three-phase pulses according to the difference between the electric motor iron loss power and the heating power until the difference between the electric motor iron loss power and the heating power is less than the preset value, to enable the electric motor to be actively heated, specifically includes: continuously detecting a total loss power generated by the copper loss and the iron loss, determining a difference between the total loss power and the heating power, and adjusting the phase difference of the three-phase pulses according to the difference between the total loss power and the heating power until the difference between the total loss power and the heating power is less than a preset value, to enable the electric motor to be actively heated.

Further, the method of adjusting the duty cycle is used for heating firstly, and in a case that the adjustment of the duty cycle is not enough to achieve the required heating power, the method of adjusting the phase is then used to supplement the heat, which can achieve the effect of further increasing the heating speed of the battery.

In a possible implementation, determining the current value of each phase of the three-phase pulses according to the heating power includes: determining the current value of each phase of the three-phase pulses according to an electric motor resistance, a conduction voltage drop of a built-in power transistor, a single-switching loss per unit current of the built-in power transistor, a switching frequency of the built-in power transistor and a current relationship of the three-phase pulses.

Further, the current value of each phase is obtained by the electric motor resistance, the conduction voltage drop of the built-in power transistor, the single-switching loss per unit current of the built-in power transistor, the switching frequency of the built-in power transistor and the current relationship of the three-phase pulses, which enables the initial current value to be relatively large and is thus beneficial to faster temperature rise.

In a possible implementation, a calculation formula for determining the current value of each phase of the three-phase pulses according to the electric motor resistance, the conduction voltage drop of the built-in power transistor, the single-switching loss per unit current of the built-in power transistor, the switching frequency of the built-in power transistor and the current relationship of the three-phase pulses is as follows:

$$P = \left(I_a^2 + I_b^2 + I_c^2\right)R + (I_a + I_b + I_c)V_{ce} + (I_a + I_b + I_c)Q \cdot F$$

$$\text{where} - I_a = I_b + I_c,\ I_b = k \cdot I_c$$

where $I_a$ is a current of phase a, $I_b$ is a current of phase b, $I_c$ is a current of phase c, R is the electric motor resistance, $V_{ce}$ is the conduction voltage drop of the built-in power transistor, Q is the single-switching loss per unit current of the built-in power transistor. F is the switching frequency of the built-in power transistor, and k is a constant determined according to a rotor position.

Further, by combining the preset formula and the current relationship of the three-phase pulses, the current value of each phase is calculated, which enables the initial current to be higher, thereby increasing the heating speed.

In a possible implementation, measuring the actual copper loss power includes: measuring a current value and a voltage value input from an electric vehicle electronic control unit to the electric motor, and determining the actual copper loss power according to the current value and the voltage value; or measuring an inlet-outlet temperature difference and a coolant flow rate of an electric drive system coolant, and determining the actual copper loss power of the electric motor according to the inlet-outlet temperature difference and the coolant flow rate.

Further, the actual copper loss power is calculated by the current value and the voltage value, or the actual copper loss power is calculated by the inlet-outlet temperature difference and the coolant flow rate of the electric drive system coolant, which facilitates accurate determination of the difference between the total loss and the heating power and more accurate adjustment of the heating power.

In a possible implementation, adjusting the phase of the three-phase pulses according to the actual copper loss power and the heating power includes: calculating a difference between the actual copper loss power and the heating power, and looking up a corresponding phase difference in a second comparison table according to the difference between the actual copper loss power and the heating power, where the second comparison table includes a correspondence between a difference between an actual copper loss power and a heating power and a phase difference: adjusting the phase of the three-phase pulses using the corresponding phase difference.

Further, the phase difference corresponding to the difference between the actual copper loss power and the heating power is obtained by looking up the correspondence, and the phase of the three-phase pulses is adjusted using the obtained phase difference, which achieves the effect of accelerating the heating speed of the electric motor.

In a second aspect, the present application provides an active heating apparatus for an electric motor, including:

an instruction receiving module, configured to receive a heating instruction sent by a heat management system, where the heating instruction includes a heating power; a first adjusting module, configured to input a current to the electric motor and adjust a phase of three-phase pulses according to the heating power; a second adjusting module, configured to continuously detect an electric motor iron loss power, determine a difference between the electric motor iron loss power and the heating power, and adjust a phase difference of the three-phase pulses according to the difference between the electric motor iron loss power and the heating power until the difference between the electric motor iron loss power and the heating power is less than a preset value, to enable the electric motor to be actively heated.

In a third aspect, the present application provides an electronic device, including: a processor, and a memory communicatively connected to the processor. The memory stores computer execution instructions, and the processor executes the computer execution instructions stored in the memory, so that the processor executes the active heating method for the electric motor as described above in the first aspect.

In a fourth aspect, the present application provides a non-transitory computer-readable storage medium. The non-transitory computer-readable storage medium stores computer execution instructions, and when the computer execution instructions are executed by a processor, the active heating method for the electric motor as described above in the first aspect is implemented.

In a fifth aspect, the present application provides a computer program product including a computer program. When the computer program is executed by a processor, the active heating method for the electric motor as described above in the first aspect is implemented.

Through the active heating method for the electric motor, the apparatus, the device, the storage medium and the program product provided by the present application, after receiving the heating instruction, the phase of the three-phase pulses of the electric motor is changed, which can achieve the purpose of increasing the electric motor iron loss to heat the electric motor. After changing the phase of the three-phase pulses, the determination of whether the difference between the obtained iron loss power and the heating power contained in the heating instruction meets the requirement is continued, so as to continue to adjust the phase difference, which achieves the effect of enabling the electric motor iron loss power to be close to the heating power, continuously improving the heating efficiency of the electric motor and thus improving the speed of heating up of the battery.

DESCRIPTION OF EMBODIMENTS

Exemplary embodiments will be described in detail herein, and examples thereof are illustrated in the accompanying drawings. When the following description refers to the drawings, unless otherwise indicated, the same number in different drawings represents the same or similar element. The implementations described in the following exemplary embodiments do not represent all implementations consistent with the present application. On the contrary, they are only examples of apparatuses and methods consistent with some aspects of the present application as detailed in the appended claims.

Currently, electric vehicle technology is developing rapidly, and electric vehicles can often be seen on the streets of cities. The electric vehicles have the advantages of low noise, simple structure, zero emissions and so on. At the same time, the electric vehicles are also facing many challenges. For example, the number of charging piles needs to be improved, battery performance is degraded at low temperature, etc.

Faced with the problem of battery performance degradation, the current main solution is to adjust a duty cycle of a certain phase of three-phase currents in an electric motor to increase a copper loss of the electric motor so as to realize heating of the electric motor, and then to transfer heat of the electric motor to a battery by an apparatus such as a pipeline containing a coolant so as to realize heating of the battery. However, the current method of using the duty cycle to realize the heating of the electric motor has low heating efficiency, and the speed of increasing the temperature of the battery is slow.

In view of the above technical problems, the present application proposes the following technical concept: by inputting three-phase pulses to an electric motor after receiving a heating instruction, and changing a phase difference of the three-phase pulses to increase an iron loss of the electric motor, active heating of the electric motor is realized.

Figure 1:
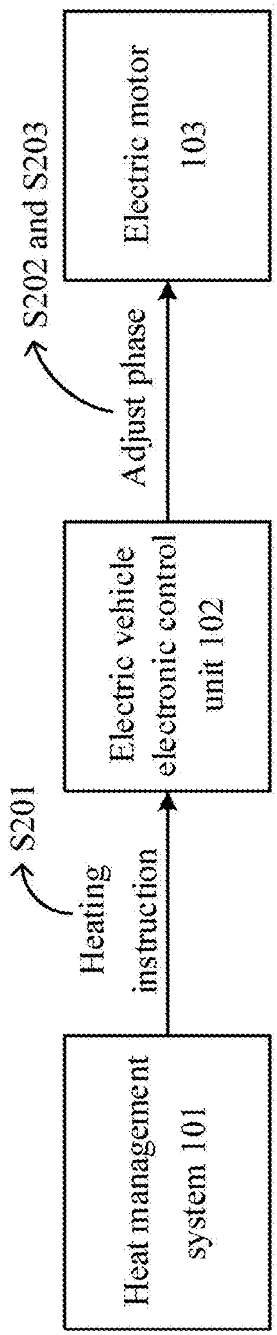
FIG. 1 is a schematic diagram of an application scenario of an active heating method for an electric motor provided by an embodiment of the present application.

FIG. 1 is a schematic diagram of an application scenario of an active heating method for an electric motor provided by an embodiment of the present application. As shown in FIG. 1, in the scenario, a heat management system 101, electric vehicle electronic control unit 102, and an electric motor 103 are included.

In a specific implementation process, the heat management system 101 is configured to send a heating instruction to the electric vehicle electronic control unit 102. The heating instruction may be sent when temperature is lower than preset temperature, or may be sent after receiving a control instruction from an external device, such as a server, a computer, a mobile phone, etc.

The electric vehicle electronic control unit 102 is configured to input a current to the electric motor 103 and adjust a phase difference of three-phase pulses after receiving the heating instruction. After adjusting the phase difference of the three-phase pulses, an electric motor iron loss power is continuously detected. If a difference between the iron loss power and a heating power exceeds a preset value, adjustment of the phase difference of the three-phase pulses is continued until the difference between the iron loss power and the heating power is less than the preset value. Finally the heat is transferred to a battery through an apparatus such as a heat pump.

It can be understood that, the structure illustrated in the embodiment of the present application does not constitute a specific limitation on an active heating method for an electric motor. In some other feasible implementations of the present application, the foregoing architecture may include more or fewer components than those shown in the figure, or some components may be combined, or some components may be split, or there may be different component arrangements, which may be specifically determined according to an actual application scenario and is not limited herein. The components shown in FIG. 1 may be implemented in hardware, software, or a combination of software and hardware.

The technical solutions of the present application and how the technical solutions of the present application solve the above technical problems are described in detail below with specific embodiments. The following several specific embodiments may be combined with each other, and a same or similar concept or process may not be repeated in some embodiments. The embodiments of the present application will be described below with reference to the accompanying drawings.

Figure 2:
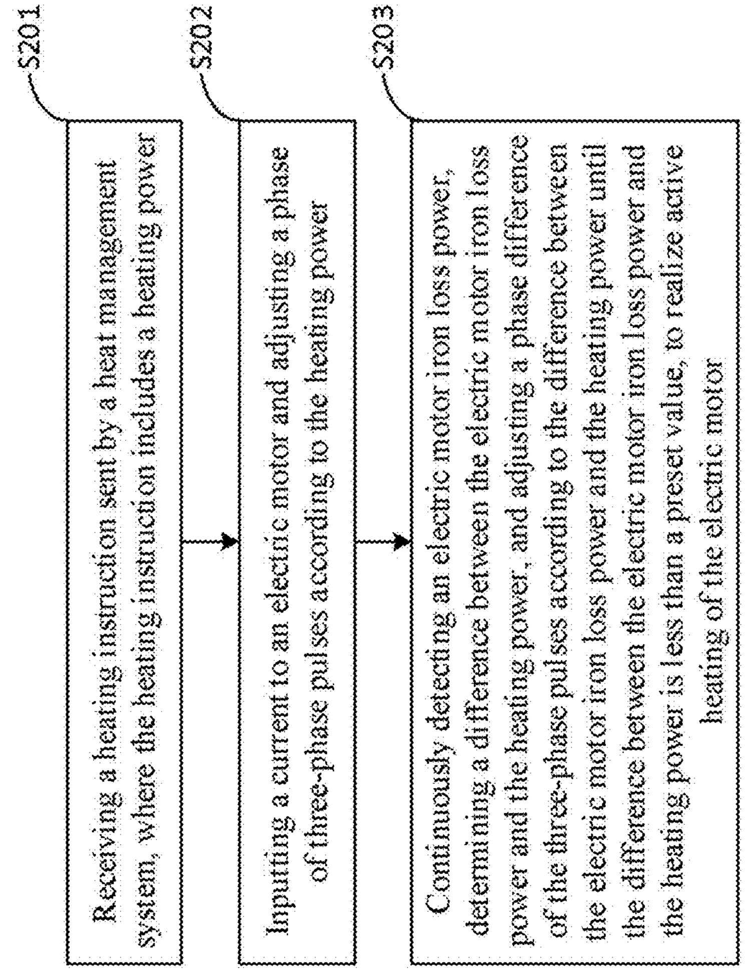
FIG. 2 and FIGS. 2A-2D are schematic flowcharts of an active heating method for an electric motor provided by embodiments of the present application.

FIG. 2 is a schematic flowchart of an active heating method for an electric motor provided by an embodiment of the present application. An executive entity of the embodiment of the present application may be the electric vehicle electronic control unit 102 in FIG. 1. As shown in FIG. 2, the method includes the following steps.

S201: receiving a heating instruction sent by a heat management system, where the heating instruction includes a heating power.

In this step, the heating instruction may further include an instruction for starting heating, and the heating power may be preset or may be obtained according to ambient temperature, which is not particularly limited in the present application.

S202: inputting a current to the electric motor and adjusting a phase of three-phase pulses according to the heating power.

In this step, inputting the current to the electric motor may be inputting the current with a preset magnitude, or may be inputting the current whose magnitude is directly proportional to the heating power to the electric motor. Adjusting the phase of the three-phase pulses may be adjusting the phase value of a certain phase of the three-phase pulses with a preset phase value, so that the phase difference of the adjusted phase reaches the preset phase value. Adjusting the phase of the three-phase pulses may also be adjusting the phase value of a certain phase of the three-phase pulses with a phase value directly proportional to the heating power, so that the phase difference of the three-phase pulses increases with the increase of the heating power.

The preset phase value may be 10°, 15°, 30°, etc.

Figure 3:
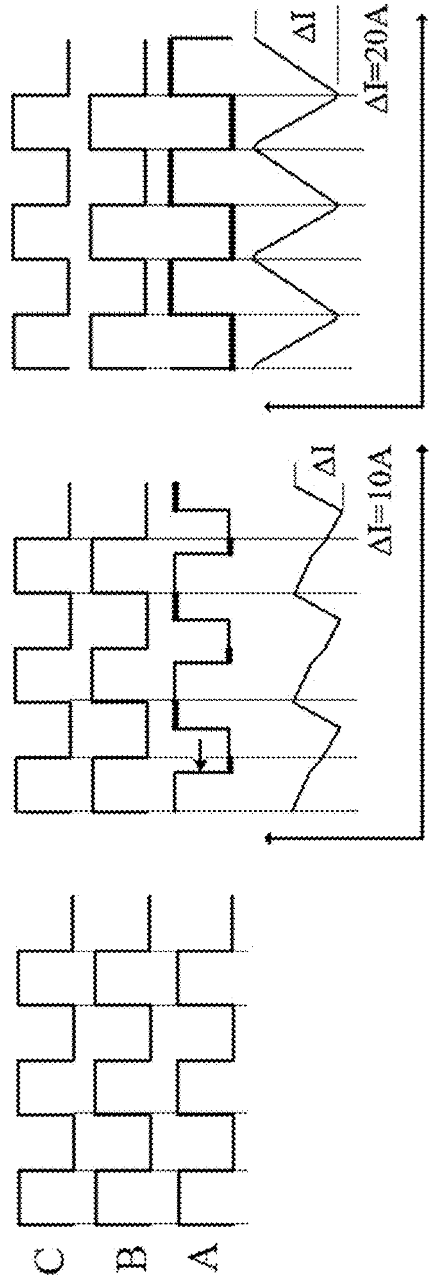
FIG. 3 is a schematic diagram of phases of three-phase pulses provided by an embodiment of the present application.

FIG. 3 is a schematic diagram of phases of three-phase pulses provided by an embodiment of the present application. As shown in the left picture in FIG. 3, the three-phase pulses consist of three phases A, B and C, which have the same phase and whose phase difference is zero. Adjusting the phase value of phase A is taken as an example. As shown in the middle picture in FIG. 3, after the phase value of phase A thereof is adjusted, the phase value of phase A of the three-phase pulses changes. The phase difference of three phases is not 0, and the non-overlapping part of the three phases increases (as shown in the bold part in FIG. 3). When the voltage of phase A is equal to the battery voltage, and the voltages of phase B and C are 0, the current increases. When the voltage of phase A is 0 and the voltages of phase B and C are the battery voltage, the current drops rapidly. When the pulses of three phases overlap, the current overcomes a loop impedance, thus the current decreases slowly. The current waveform is a pulse waveform as shown in the lower part, where the highest current is, for example, 10 A, and the present application does not limit the maximum value that the current reaches. The maximum adjustment range of the phase difference is shown in the right picture in FIG. 3. Here, the phase of phase A is adjusted by a ½ cycle, the phase difference is 180°, and the thick line part where the pulses of three phases do not overlap is the longest. When the voltage of phase A is the battery voltage, the current increases. When the voltage of phase A is 0, and the voltages of phase B and C are the battery voltage, the current drops rapidly. In this case, the current peak value, which is 20 A as shown in the right picture, is higher than that in the middle picture of FIG. 3. The present application also does not limit the maximum value that the current reaches in this case.

S203: continuously detecting an electric motor iron loss power, determining a difference between the electric motor iron loss power and the heating power, and adjusting a phase difference of the three-phase pulse according to the difference between the electric motor iron loss power and the heating power until the difference between the electric motor iron loss power and the heating power is less than a preset value, to realize active heating of the electric motor.

In this step, the electric motor iron loss power may be detected by detecting an electric motor temperature change, or detecting a coolant temperature change in an electric drive system, and then calculating the heat corresponding to the temperature change to obtain the electric motor iron loss power. Since there may be a difference between the temperature change obtained by detection and the actual power, a constant may be introduced for correction. If the difference obtained by subtracting the heating power from the electric motor iron loss power is greater than the preset value, then the phase difference is reduced. If the absolute value of the difference obtained by subtracting the heating power from the electric motor iron loss power is greater than the preset value, and the difference is not greater than the preset value, which indicates that the electric motor iron loss power is less than the heating power, then the phase difference is increased. The preset value may be a fixed value, or may be obtained by calculation according to a certain proportion of the heating power.

For example, if the electric motor iron loss power obtained by detection is 10 kW and the heating power is 20 kW, then the difference obtained by subtracting the heating power from the electric motor iron loss power is −10 kW. If the preset value is 5 kW, then the absolute value of the difference is greater than the preset value, and the difference is less than the preset value, which indicates that the phase difference needs to be increased. If the electric motor iron loss power obtained by detection is 18 kW and the heating power is 20 kW, then the difference obtained by subtracting the heating power from the electric motor iron loss power is −2 kW. If the preset value is 5 kW, then the difference and the absolute value of the difference are both less than the preset value, which indicates that the requirement is met and the phase difference no longer needs to be changed. The preset value may be 5 kW as mentioned above, or may be 3 kW or 2 kW, etc., or may be a preset proportion of the heating power, such as 10%, 7% or 5% of the heating power, etc.

It can be known from the description of the above embodiment that in the embodiment of the present application, after receiving the heating instruction, the phase of the three-phase pulses of the electric motor is changed, which can realize the purpose of increasing the electric motor iron loss to heat the electric motor. After changing the phase of the three-phase pulses, the determination of whether the difference between the obtained iron loss power and the heating power contained in the heating instruction meets the requirement is continued, so as to continue to adjust the phase difference, which achieves the effect of enabling the iron loss power of the electric motor to be close to the heating power, continuously improving the heating efficiency of the electric motor and thus improving the speed of heating up of the battery.

Figure 2A:
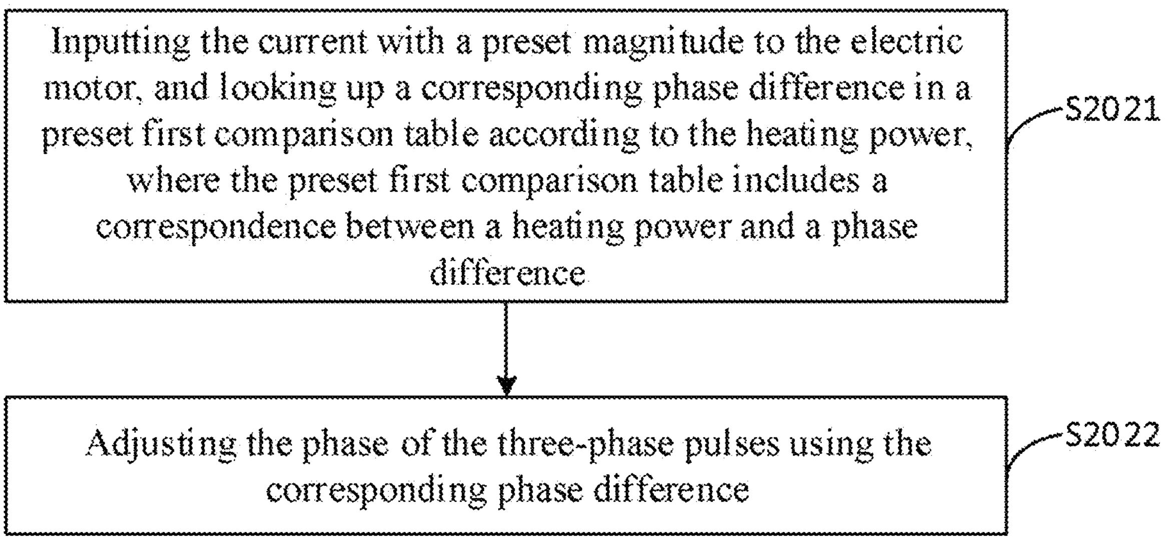

In a possible implementation, as shown in FIG. 2A, in the above step S202, inputting the current to the electric motor and adjusting the phase of the three-phase pulses according to the heating power specifically includes the following steps.

S2021: inputting the current with a preset magnitude to the electric motor, and looking up a corresponding phase difference in a preset first comparison table according to the heating power, where the preset first comparison table includes a correspondence between a heating power and a phase difference.

In this step, the current with the preset magnitude may be that the current value is of the preset magnitude, or the voltage value is of the preset magnitude, which is not particularly limited in the present application. The preset first comparison table may be obtained through an experimental test in advance.

S2022: adjusting the phase of the three-phase pulses using the corresponding phase difference.

In this step, the phase of the three-phase pulses may be adjusted, so that the phase difference occurring in the three-phase pulses is of the same magnitude as the above corresponding phase difference.

As can be seen from the description of the above embodiment, the embodiment of the present application provides a specific manner of adjusting the phase. By looking up the phase difference corresponding to the heating power in the first comparison table, the phase difference close to or equal to the heating power is directly obtained, which reduces the time for subsequently adjusting the phase multiple times due to the insufficient iron loss power.

In a possible implementation, in the above step S203, detecting the electric motor iron loss power specifically includes: measuring an inlet-outlet temperature difference and a coolant flow rate of an electric drive system coolant, and determining the electric motor iron loss power according to the inlet-outlet temperature difference and the coolant flow rate.

In a possible implementation, a calculation formula for determining the electric motor iron loss power according to the inlet-outlet temperature difference and the coolant flow rate is as follows:

$$P = C \cdot D \cdot F \cdot \Delta T \cdot A$$

where P is the electric motor iron loss power, C is a coolant specific heat capacity, D is a coolant density, F is the coolant flow rate, ΔT is the inlet-outlet temperature difference, and A is a constant.

The measurement of the inlet-outlet temperature difference of the electric drive system coolant may be obtained by detection with a temperature sensor. The coolant flow rate may be obtained by measurement with a flow rate measuring instrument, or may be obtained by calculation from the power of a pump that causes the coolant to flow.

The temperature sensor may be a contact temperature sensor or a non-contact temperature sensor. The constant A may be used to unify the unit, and may also be adjusted based on an empirical value to eliminate an error. The coolant density D may be 1.0559 $kg/m^3$, and the coolant specific heat capacity C may be 3.13. Different coolants may have different densities and specific heat capacities, which is not limited in the present application. The coolant flow rate may be 10 L/min, which is only an example here, and the unit and value of the flow rate may also be adjusted according to different situations.

It can be seen from the description of the above embodiment that in the embodiment of the present application, the electric motor iron loss power is determined by the inlet-outlet temperature difference and the coolant flow rate of the electric drive system coolant that are obtained by measurement, which facilitates the phase adjustment.

Figure 2B:
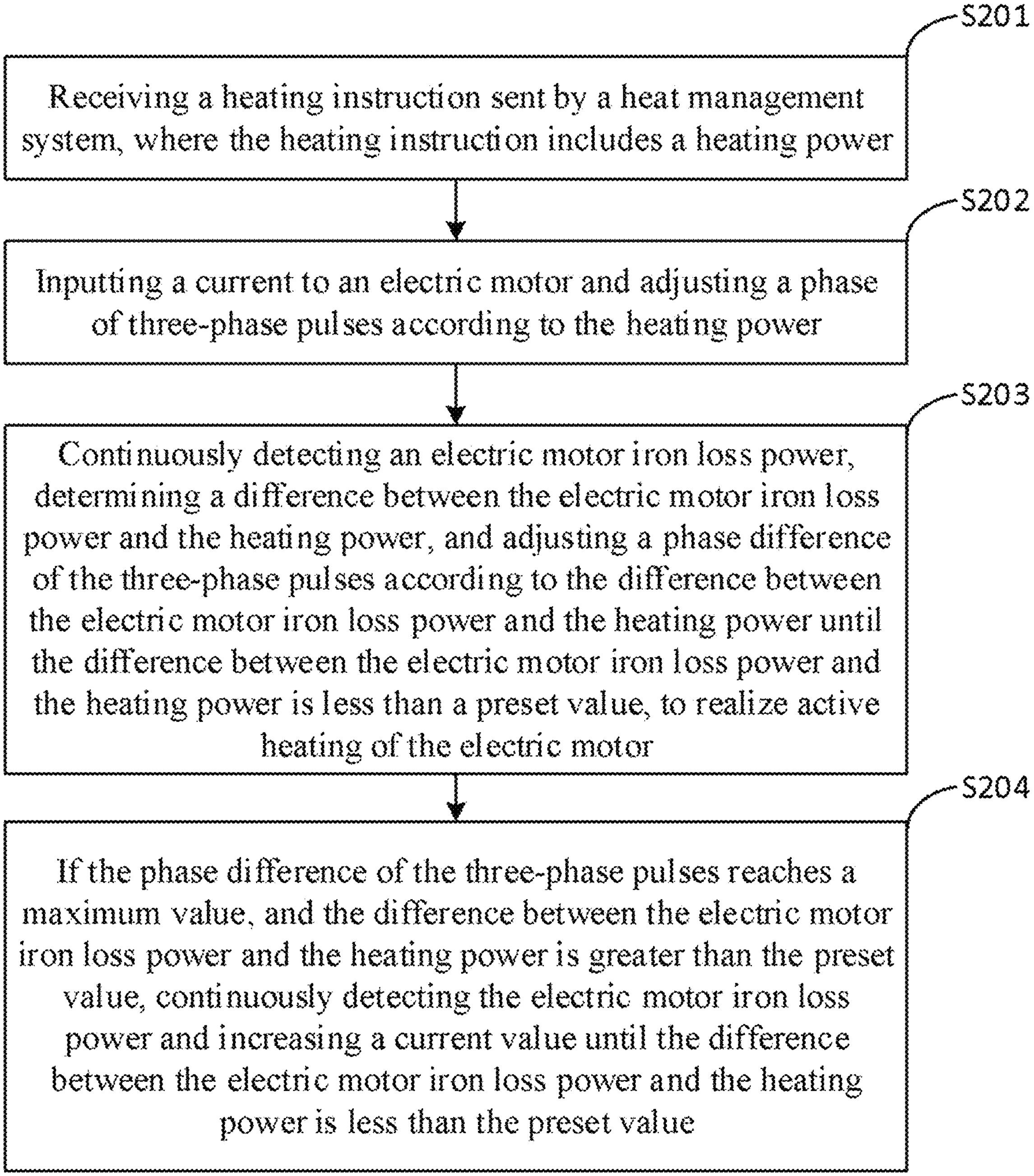

In a possible implementation, as shown in FIG. 2B, after the above step S203, i.e. after adjusting the phase difference of the three-phase pulses, the method further includes:

S204: if the phase difference of the three-phase pulses reaches a maximum value, and the difference between the electric motor iron loss power and the heating power is greater than the preset value, continuously detecting the electric motor iron loss power and increasing a current value until the difference between the electric motor iron loss power and the heating power is less than the preset value.

In this step, increasing the current value may be increasing the current value according to a preset value, or may be determining the magnitude of the current that needs to be increased according to the difference between the electric motor iron loss power and the heating power.

Specifically, a corresponding current value that needs to be increased may be looked up in a preset third comparison table, and a relationship between a difference between an electric motor iron loss power and a heating power and a current value is stored in the third comparison table. In this step, "until the difference between the electric motor iron loss power and the heating power is less than a preset value" is similar to that in step S203, and is not described here again.

It can be seen from the description of the above embodiment that in the embodiment of the present application, the current is increased in a case that the phase difference reaches the maximum value and that the electric motor iron loss power does not reach the heating power and the difference between the electric motor iron loss power and the heating power is large, which achieves the effect of further increasing the heating efficiency of the electric motor.

Figure 2C:
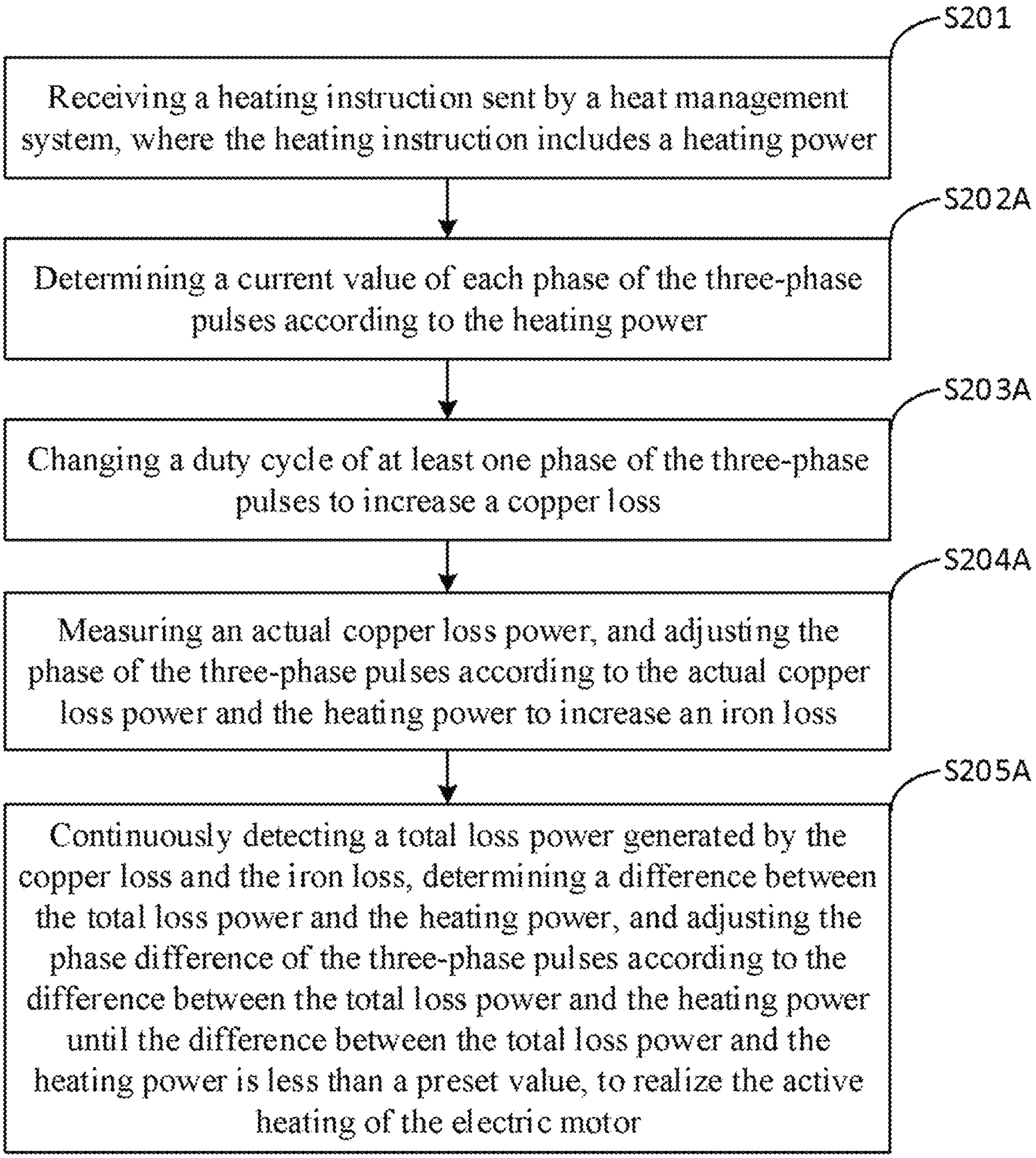

In a possible implementation, as shown in FIG. 2C, after the above step S201, i.e. after receiving the heating instruction sent by the heat management system, where the heating instruction includes the heating power, the method further includes the following steps.

S202A: determining a current value of each phase of the three-phase pulses according to the heating power.

In this step, the current value of each phase of the three-phase pulses may be calculated according to the heating power and properties of the electric motor and the electric vehicle electronic control unit. The current value of each phase of the three-phase pulse may also be looked up in a preset fourth comparison table, where the fourth comparison table stores a relationship between a heating power and each phase of the three-phase pulses.

S203A: changing a duty cycle of at least one phase of the three-phase pulses to increase a copper loss.

Figure 4:
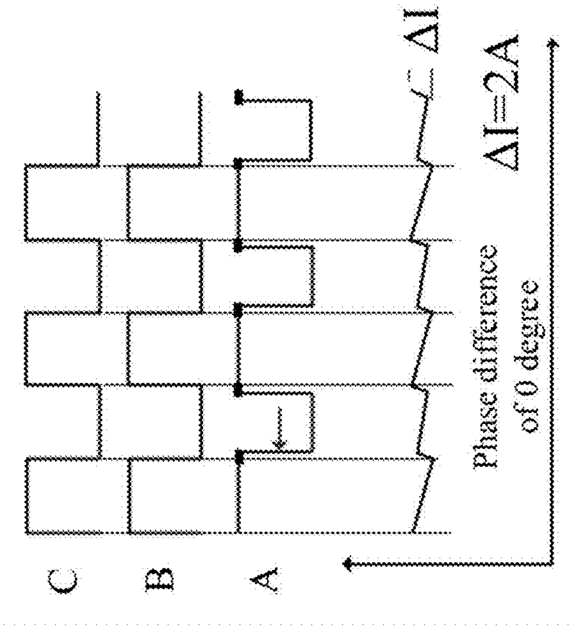
FIG. 4 is a schematic diagram of duty cycles of three-phase pulses provided by an embodiment of the present application.

In this step, the duty cycle may be changed by a symmetrical modulation method. When the duty cycle of one phase of the three-phase pulses is different from the other two phases, since the pulses of three phases do not overlap, the current will increase in the non-overlapping part, and the current will gradually decrease in the overlapping part. FIG. 4 is a schematic diagram of a duty cycle of three-phase pulses provided by an embodiment of the present application. As shown in FIG. 4, in the bold part where the pulses of three phases do not overlap, the current increases. The duty cycle change is usually small, and the current increases less. In the overlapping part of the pulses of three phases, the voltages of the three phases are the same. Due to an impedance in the circuit, the current slowly decreases. The maximum current value is small at this time, such as 2 A in the figure, and the iron loss is small at this time.

S204A: measuring an actual copper loss power, and adjusting the phase of the three-phase pulses according to the actual copper loss power and the heating power to increase an iron loss.

In this step, the method of measuring the actual copper loss power may also be similar to the method used in the above step S203, i.e., the actual power may be obtained by measuring the coolant temperature change.

In a possible implementation, measuring the actual copper loss power specifically includes:

measuring a current value and a voltage value input from an electric vehicle electronic control unit to the electric motor, and determining the actual copper loss power according to the current value and the voltage value; or, measuring an inlet-outlet temperature difference and a coolant flow rate of an electric drive system coolant, and determining the actual copper loss power of the electric motor according to the inlet-outlet temperature difference and the coolant flow rate.

Here, a calculation formula for determining the actual copper loss power according to the current value and the voltage value is as follows:

$$P_c = I_{dc} \times U_{dc}$$

$P_c$ is the actual copper loss power, $I_{dc}$ is the current value, and $U_{dc}$ is the voltage value.

The method for determining the actual copper loss power of the electric motor according to the inlet-outlet temperature difference and the coolant flow rate is similar to the above step S203, and will not be repeated here.

S205A: continuously detecting a total loss power generated by the copper loss and the iron loss, determining a difference between the total loss power and the heating power, and adjusting the phase difference of the three-phase pulses according to the difference between the total loss power and the heating power until the difference between the total loss power and the heating power is less than a preset value, to realize the active heating of the electric motor.

This step is similar to the above step S203, and will not be repeated here.

As can be seen from the description of the above embodiment, the embodiment of the present application provides the method in which the method of adjusting the duty cycle is used for heating firstly, and in a case that the adjustment of the duty cycle is not enough to achieve the required heating power, the method of adjusting the phase is then used to supplement the heat, which can achieve the effect of further increasing the heating speed of the battery.

In a possible implementation, determining the current value of each phase of the three-phase pulses according to the heating power in the above step S204A specifically includes:

determining the current value of each phase of the three-phase pulses according to an electric motor resistance, a conduction voltage drop of a built-in power transistor, a single-switching loss per unit current of the built-in power transistor, a switching frequency of the built-in power transistor and a current relationship of the three-phase pulses.

In a possible implementation, a calculation formula for determining the current value of each phase of the three-phase pulses according to the electric motor resistance, the conduction voltage drop of the built-in power transistor, the single-switching loss per unit current of the built-in power transistor, the switching frequency of the built-in power transistor and the current relationship of the three-phase pulses is as follows:

$$P = (I_a^2 + I_b^2 + I_c^2)R + (I_a + I_b + I_c)V_{ce} + (I_a + I_b + I_c)Q \cdot F$$
$$\text{where } -I_a = I_b + I_c,\ I_b = k \cdot I_c$$

in the formula, $I_a$ is the current of phase a, $I_b$ is the current of phase b, $I_c$ is the current of phase c, R is the electric motor resistance, $V_{ce}$ is the conduction voltage drop of the built-in power transistor, Q is the single-switching loss per unit current of the built-in power transistor, F is the switching frequency of the built-in power transistor, and k is a constant determined according to a rotor position. Here, $-I_a=I_b+I_c$ and $I_b=k \cdot I_c$ represent the current relationship of the three-phase pulses. The built-in power transistor may be a power transistor built in the electric vehicle electronic control unit.

As can be seen from the description of the above embodiment, the embodiment of the present application provides the calculation method of the current value of each phase of the three-phase pulses, which can achieve the effect of enabling the initial current value to be relatively large and is thus beneficial to temperature rise.

Figure 2D:
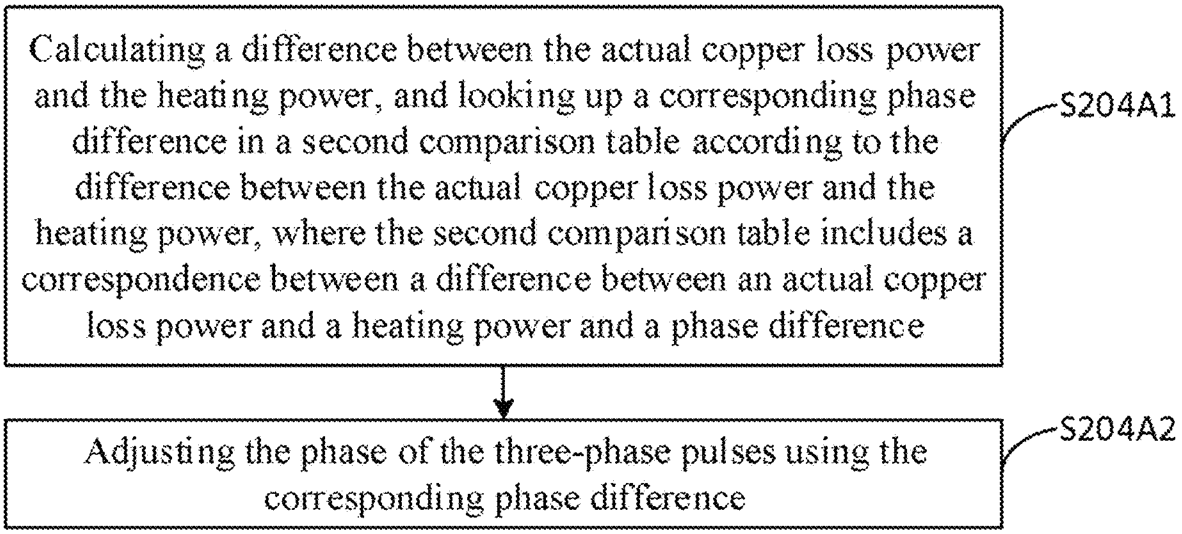

In a possible implementation, as shown in FIG. 2D, adjusting the phase of the three-phase pulses according to the actual copper loss power and the heating power in the above step S204A includes the following steps.

S204A1: calculating a difference between the actual copper loss power and the heating power, and looking up a corresponding phase difference in a second comparison table according to the difference between the actual copper loss power and the heating power, where the second comparison table includes a correspondence between a difference between an actual copper loss power and a heating power and a phase difference.

This step is similar to the above step S2021, and will not be repeated here.

S204A2: adjusting the phase of the three-phase pulses using the corresponding phase difference.

This step is similar to the above step S2022, and will not be repeated here.

As can be seen from the description of the above embodiment, in the embodiment of the present application, the phase difference corresponding to the difference between the actual copper loss power and the heating power is obtained by looking up the correspondence, and the phase of the three-phase pulses is adjusted using the obtained phase difference, which achieves the effect of accelerating the heating speed of the electric motor.

Figure 5:
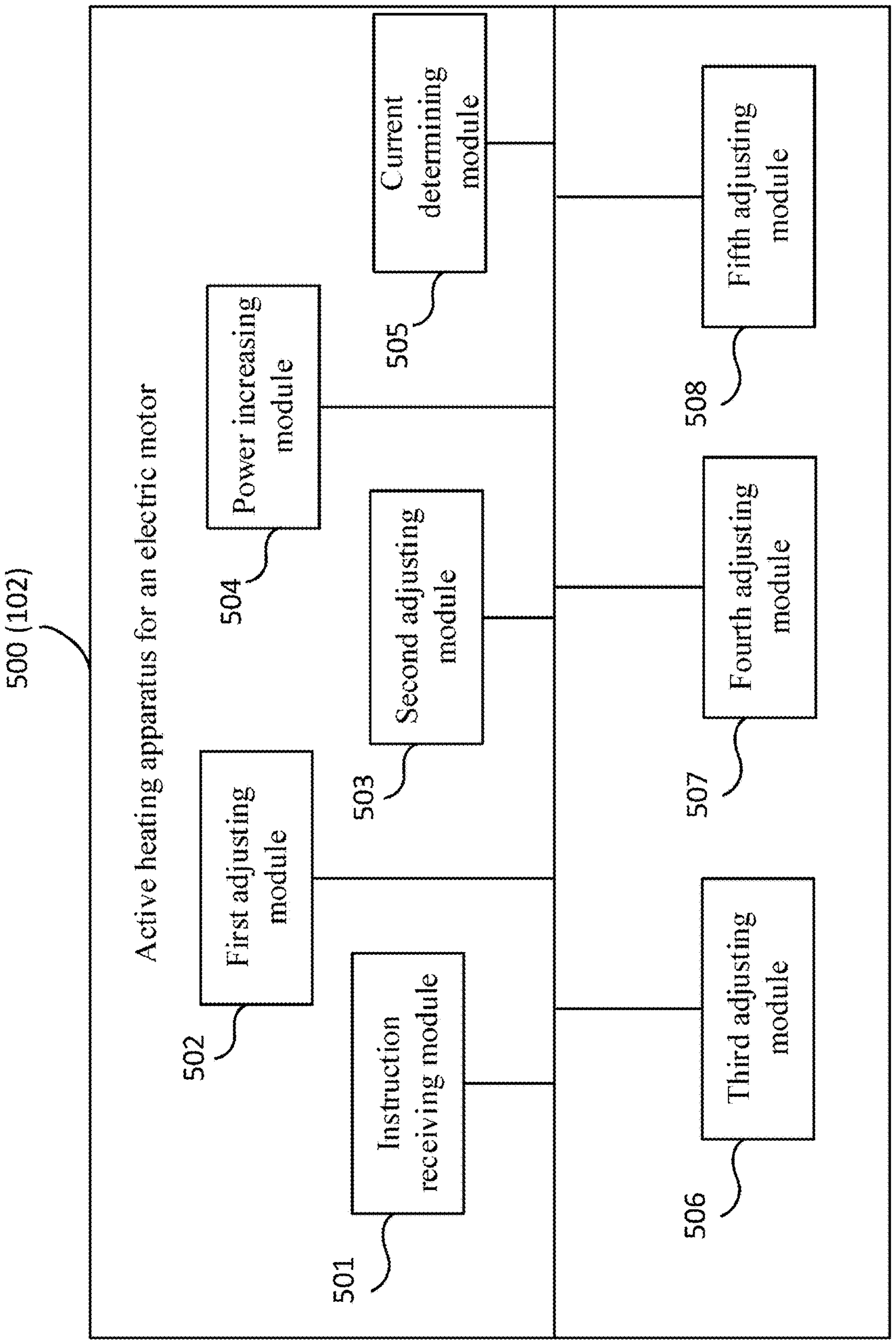
FIG. 5 is a schematic diagram of an active heating apparatus for an electric motor provided by an embodiment of the present application.

FIG. 5 is a schematic diagram of an active heating apparatus for an electric motor provided by an embodiment of the present application. As shown in FIG. 5, the active heating apparatus 500 for the electric motor includes: an instruction receiving module 501, a first adjusting module 502 and a second adjusting module 503.

The instruction receiving module 501 is configured to receive a heating instruction sent by a heat management system, where the heating instruction includes a heating power.

The first adjusting module 502 is configured to input a current to the electric motor and adjust a phase of three-phase pulses according to the heating power.

The second adjusting module 503 is configured to continuously detect an electric motor iron loss power, determine a difference between the electric motor iron loss power and the heating power, and adjust a phase difference of the three-phase pulses according to the difference between the electric motor iron loss power and the heating power until the difference between the electric motor iron loss power and the heating power is less than a preset value, to realize active heating of the electric motor.

The apparatus provided in this embodiment can be used to execute the technical solutions in the foregoing method embodiments. Implementation principles and technical effects thereof are similar, and details will not be described here again in this embodiment.

In a possible implementation, the first adjusting module 502 is specifically configured to: input the current with a preset magnitude to the electric motor, and look up a corresponding phase difference in a preset first comparison table according to the heating power, where the preset first comparison table includes a correspondence between a heating power and a phase difference: adjust the phase of the three-phase pulses using the corresponding phase difference.

The apparatus provided in this embodiment can be used to execute the technical solutions in the foregoing method embodiments. Implementation principles and technical effects thereof are similar, and details will not be described here again in this embodiment.

In a possible implementation, the second adjusting module 503 is specifically configured to: measure an inlet-outlet temperature difference and a coolant flow rate of an electric drive system coolant, and determine the electric motor iron loss power according to the inlet-outlet temperature difference and the coolant flow rate.

The apparatus provided in this embodiment can be used to execute the technical solutions in the foregoing method embodiments. Implementation principles and technical effects thereof are similar, and details will not be described here again in this embodiment.

In a possible implementation, for measuring the inlet-outlet temperature difference and the coolant flow rate of the electric drive system coolant, and determining the electric motor iron loss power according to the inlet-outlet temperature difference and the coolant flow rate, a calculation formula used by the second adjusting module 503 may be:

$$P = C \cdot D \cdot F \cdot \Delta T \cdot A$$

where P is the electric motor iron loss power, C is a coolant specific heat capacity, D is a coolant density, F is the coolant flow rate, $\Delta T$ is the inlet-outlet temperature difference, and A is a constant.

The apparatus provided in this embodiment can be used to execute the technical solutions in the foregoing method embodiments. Implementation principles and technical effects thereof are similar, and details will not be described here again in this embodiment.

Continue referring to FIG. 5. As shown in FIG. 5, in a possible implementation, the active heating apparatus 500 for the electric motor further includes a power increasing module 504.

The power increasing module 504 is configured to, if the phase difference of the three-phase pulses reaches a maximum value, and the difference between the electric motor iron loss power and the heating power is greater than the preset value, continuously detect the electric motor iron loss power and increase a current value until the difference between the electric motor iron loss power and the heating power is less than the preset value.

The apparatus provided in this embodiment can be used to execute the technical solutions in the foregoing method embodiments. Implementation principles and technical effects thereof are similar, and details will not be described here again in this embodiment.

Continue referring to FIG. 5. In a possible implementation, as shown in FIG. 5, the active heating apparatus 500 for the electric motor further includes: a current determining module 505, a third adjusting module 506, a fourth adjusting module 507 and a fifth adjusting module 508.

The current determining module 505 is configured to determine a current value of each phase of the three-phase pulses according to the heating power.

The third adjusting module 506 is configured to change a duty cycle of at least one phase of the three-phase pulses to increase a copper loss.

The fourth adjusting module 507 is configured to measure an actual copper loss power, and adjust the phase of the three-phase pulses according to the actual copper loss power and the heating power to increase an iron loss.

The fifth adjusting module 508 is configured to continuously detect a total loss power generated by the copper loss and the iron loss, determine a difference between the total loss power and the heating power, and adjust the phase difference of the three-phase pulses according to the difference between the total loss power and the heating power until the difference between the total loss power and the heating power is less than a preset value, to realize the active heating of the electric motor.

The apparatus provided in this embodiment can be used to execute the technical solutions in the foregoing method embodiments. Implementation principles and technical effects thereof are similar, and details will not be described here again in this embodiment.

In a possible implementation, the above current determining module 505 is specifically configured to determine the current value of each phase of the three-phase pulse according to an electric motor resistance, a conduction voltage drop of a built-in power transistor, a single-switching loss per unit current of the built-in power transistor, a switching frequency of the built-in power transistor and a current relationship of the three-phase pulses.

The apparatus provided in this embodiment can be used to execute the technical solutions in the foregoing method embodiments. Implementation principles and technical effects thereof are similar, and details will not be described here again in this embodiment.

In a possible implementation, a calculation formula used by the above current determining module 505 is as follows:

$$P = \left(I_a^2 + I_b^2 + I_c^2\right)R + (I_a + I_b + I_c)V_{ce} + (I_a + I_b + I_c)Q \cdot F$$

-continued $$\text{where} - I_a = I_b + I_c,\ I_b = k \cdot I_c$$

in the formula, $I_a$ is the current of phase a, $I_b$ is the current of phase b, $I_c$ is the current of phase c, R is the electric motor resistance, $V_{ce}$ is the conduction voltage drop of the built-in power transistor, Q is the single-switching loss per unit current of the built-in power transistor, F is the switching frequency of the built-in power transistor, and k is a constant determined according to a rotor position.

The apparatus provided in this embodiment can be used to execute the technical solutions in the foregoing method embodiments. Implementation principles and technical effects thereof are similar, and details will not be described here again in this embodiment.

In a possible implementation, the fourth adjusting module 507 is specifically configured to: measure a current value and a voltage value input from an electric vehicle electronic control unit to the electric motor, and determine the actual copper loss power according to the current value and the voltage value; or measure an inlet-outlet temperature difference and a coolant flow rate of an electric drive system coolant, and determine the actual copper loss power of the electric motor according to the inlet-outlet temperature difference and the coolant flow rate.

The apparatus provided in this embodiment can be configured to execute the technical solutions in the foregoing method embodiments. Implementation principles and technical effects thereof are similar, and details will not be described here again in this embodiment.

In a possible implementation, the fourth adjusting module 507 is specifically configured to: calculate a difference between the actual copper loss power and the heating power, and look up a corresponding phase difference in a second comparison table according to the difference between the actual copper loss power and the heating power, where the second comparison table includes a correspondence between a difference between an actual copper loss power and a heating power and a phase difference; adjust the phase of the three-phase pulses using the corresponding phase difference.

The apparatus provided in this embodiment can be used to execute the technical solutions in the foregoing method embodiments. Implementation principles and technical effects thereof are similar, and details will not be described here again in this embodiment.

In order to implement the above embodiments, an embodiment of the present application further provides an electronic device.

Figure 6:
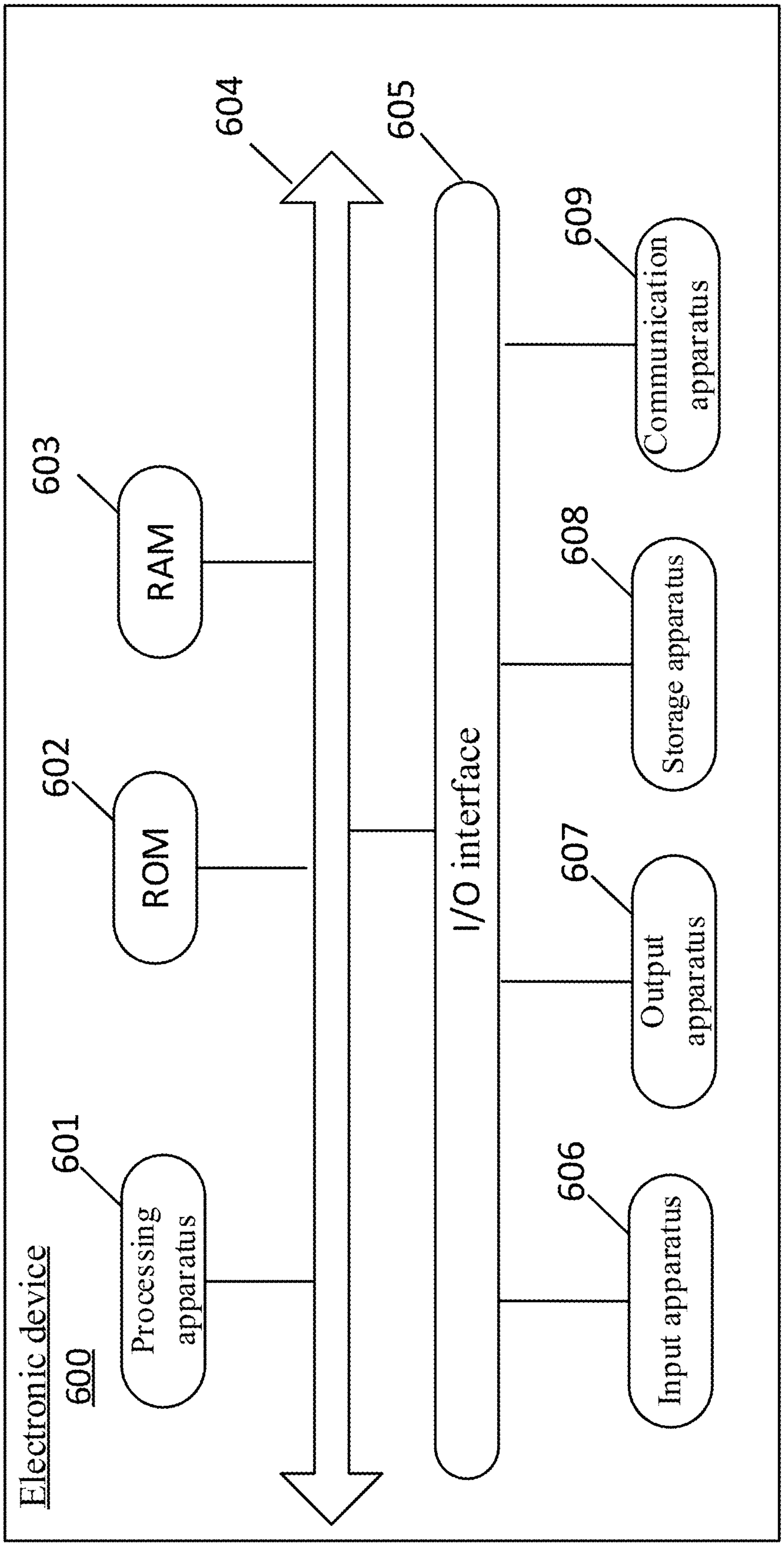
FIG. 6 is a schematic structural diagram of an electronic device in an embodiment of the present application.

Referring to FIG. 6. FIG. 6 shows a schematic structural diagram of an electronic device 600 suitable for implementing an embodiment of the present application. The electronic device 600 may be a data processing device in an electric vehicle. The electronic device shown in FIG. 6 is merely an example, and should not bring any limitation to the function and use scope of the embodiments of the present application.

As shown in FIG. 6, the electronic device 600 may include a processing apparatus (e.g., a central processing unit, a graphics processing unit, etc.) 601, which may perform various appropriate actions and processing according to a program stored in a read only memory (Read Only Memory, ROM) 602 or a program loaded from a storage apparatus 608 into a random access memory (Random Access Memory, RAM) 603. In the RAM 603, various programs and data necessary for the operation of the electronic device 600 are also stored. The processing apparatus 601, the ROM 602 and the RAM 603 are connected to each other through a bus 604. An input/output (I/O) interface 605 is also connected to the bus 604.

Generally, the following apparatuses may be connected to the I/O interface 605: an input apparatus 606 including, for example, a touch screen, a touch pad, a keyboard, a mouse, a camera, a microphone, an accelerometer, a gyroscope, etc.: an output apparatus 607 including, for example, a liquid crystal display (Liquid Crystal Display, LCD), a speaker, a vibrator, etc.; the storage apparatus 608 including, for example, a tape, a hard disk, etc.; and a communication apparatus 609. The communication apparatus 609 may allow the electronic device 600 to perform wireless or wired communication with other devices to exchange data. Although FIG. 6 illustrates the electronic device 600 with various apparatuses, it should be understood that it is not necessary to implement or provide all of the illustrated apparatuses. More or fewer apparatuses may alternatively be implemented or provided.

In particular, according to embodiments of the present application, the processes described above with reference to the flowcharts may be implemented as computer software programs. For example, an embodiment of the present application includes a computer program product including a computer program carried on a computer-readable storage medium. The computer program includes program code for performing the method illustrated in the flowchart. In such an embodiment, the computer program may be downloaded from the network through the communication device 609 and installed, or installed from the storage apparatus 608, or installed from the ROM 602. When the computer program is executed by the processing apparatus 601, the above functions defined in the methods of the embodiments of the present application are performed.

It should be noted that the computer-readable storage medium described above in the present application may be a computer-readable signal medium or a computer storage medium, or any combination thereof. The computer-readable storage medium may be, for example, but not limited to, an electronic, magnetic, optical, electromagnetic, infrared or semiconductor system, apparatus or device, or any combination thereof. More specific examples of the computer-readable storage medium may include, but not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present application, a computer-readable storage medium may be any tangible medium that contains or stores a program for use by or in connection with an instruction execution system, apparatus or device. In the present application, a computer-readable signal medium may include a data signal propagated in baseband or as part of a carrier wave, in which computer-readable program code is carried. Such propagated data signal may take a variety of forms including, but not limited to, an electromagnetic signal, an optical signal, or any suitable combination of the foregoing. A computer-readable signal medium may also be any computer-readable medium other than the computer-readable storage medium, and can send, propagate or transmit a program for use by or in connection with an instruction execution system, apparatus or device. Program code contained on a computer-readable storage medium may be transmitted using any appropriate medium, including but not limited to: a wire, an optical cable, RF (radio frequency), etc., or any suitable combination of the foregoing.

The computer-readable storage medium may be included in the above electronic device, or may exist alone without being assembled into the electronic device.

The computer-readable storage medium carries one or more programs, and when the one or more programs are executed by the electronic device, the electronic device is caused to perform the methods shown in the foregoing embodiments.

The computer program code for carrying out operations of the present application may be written in one or more programming languages, including object-oriented programming languages such as Java, Smalltalk, C++, and conventional procedural programming languages such as the "C" language or similar programming languages, or combinations thereof. The program code may be executed entirely on a user computer, or partly on the user computer, or as a stand-alone software package, or partly on the user computer and partly on a remote computer, or entirely on the remote computer or server. In the case of a remote computer, the remote computer may be connected to the user computer through any type of network, including a local area network (Local Area Network, LAN) or a wide area Network (Wide Area Network, WAN), or it may be connected to an external computer (for example, through the Internet using an Internet service provider).

The flowcharts and block diagrams in the accompanying drawings illustrate architectures, functions and operations of possible implementations of systems, methods and computer program products according to various embodiments of the present application. In this regard, each block in the flowcharts or block diagrams may represent a module, a program segment, or a portion of code, which contains one or more executable instructions for implementing the specified logical functions. It should also be noted that in some alternative implementations, the functions noted in the blocks may also occur in a different order than those noted in the figures. For example, two blocks shown in succession may in fact be executed substantially in parallel, or they may sometimes be executed in the reverse order, depending on the function involved. It is also noted that each block in the block diagrams and/or flowcharts, and combinations of blocks in the block diagrams and/or flowcharts, can be implemented with dedicated hardware-based systems that perform the specified functions or operations, or can be implemented with a combination of dedicated hardware and computer instructions.

The modules described in the embodiments of the present application may be implemented by means of software or hardware. The name of the unit does not constitute a limitation on the module itself under certain circumstances. For example, the first adjusting module may also be described as a "three-phase pulse phase adjusting module".

The functions described herein above may be performed, at least in part, by one or more hardware logic components. For example, and without limitation, exemplary types of hardware logic components that may be used include: Field Programmable Gate Arrays (FPGAs), Application Specific Integrated Circuits (ASICs), Application Specific Standard Products (ASSPs), System on a Chip (SOCs), Complex Programmable Logic Devices (CPLDs), etc.

In the context of the present application, a machine-readable medium may be a tangible medium that can contain or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination of the foregoing. More specific examples of the machine-readable storage medium would include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination thereof.

The above description is only a description of embodiments of the present application and the applied technical principles. Those skilled in the art should understand that the disclosure scope involved in the present application is not limited to the technical solutions formed by the specific combination of the above technical features, and should also cover other technical solutions formed by any combination of the above technical features or their equivalent features without departing from the above disclosed concept, for example, the technical solution formed by replacing the above features with (but not limited to) technical features having functions similar to those disclosed in the present application.

Other embodiments of the present application will readily occur to those skilled in the art upon consideration of the specification and practice of the disclosure disclosed herein. The present application is intended to cover any variations, uses or adaptive changes of the present application, and these variations, uses or adaptive changes follow the general principles of the present application and include the common knowledge or conventional technical means in the technical field that is not disclosed in the present application. The specification and embodiments are considered as exemplary only, with a true scope and spirit of the present application being indicated by the following claims.

Other embodiments of the present application will readily occur to those skilled in the art upon consideration of the specification and practice of the invention disclosed herein. The present application is intended to cover any variations, uses or adaptive changes of the present application, and these variations, uses or adaptive changes follow the general principles of the present application and include the common knowledge or conventional technical means in the technical field that is not disclosed in the present application. The specification and embodiments are considered as exemplary only, with a true scope and spirit of the present application being indicated by the following claims.

It should be understood that the present application is not limited to the precise structures that have been described above and illustrated in the accompanying drawings, and that various modifications and changes may be made without departing from the scope thereof. The scope of the present application is limited only by the appended claims.

The invention claimed is:

1. An active heating method for an electric motor, comprising:

receiving a heating instruction sent by a heat management system, wherein the heating instruction comprises a heating power;

determining a current value of each phase of three-phase pulses of the electric motor according to the heating power;

changing a duty cycle of at least one phase of the three-phase pulses to increase a copper loss of the electric motor;

measuring an actual copper loss power, and adjusting a phase difference of the three-phase pulses according to the actual copper loss power and the heating power to realize adjusting a phase of the three-phase pulses, to increase an iron loss of the electric motor;

continuously detecting a total loss power of the electric motor generated by the copper loss and the iron loss, determining a difference between the total loss power and the heating power, and adjusting the phase difference of the three-phase pulses according to the difference between the total loss power and the heating power until the difference between the total loss power and the heating power is less than a preset value, to enable the electric motor to be actively heated;

wherein the adjusting the phase difference of the three-phase pulses comprises: adjusting a phase of at least one phase of the three-phase pulses, to present the phase difference in the three-phase pulses.

2. The method according to claim 1, wherein the determining the current value of each phase of the three-phase pulses of the electric motor according to the heating power comprises:

determining the current value of each phase of the three-phase pulses of the electric motor according to an electric motor resistance, a conduction voltage drop of a built-in power transistor, a single-switching loss per unit current of the built-in power transistor, a switching frequency of the built-in power transistor and a current relationship of the three-phase pulses.

3. The method according to claim 2, wherein a calculation formula for determining the current value of each phase of the three-phase pulses of the electric motor according to the electric motor resistance, the conduction voltage drop of the built-in power transistor, the single-switching loss per unit current of the built-in power transistor, the switching frequency of the built-in power transistor and the current relationship of the three-phase pulses is as follows:

$$P=\left(I_a^2+I_b^2+I_c^2\right)R+(I_a+I_b+I_c)V_{ce}+(I_a+I_b+I_c)Q\cdot F$$

$$\text{wherein} -I_a=I_b+I_c,\ I_b=k\cdot I_c$$

in the formula, $I_a$ is a current of phase a, $I_b$ is a current of phase b, $I_c$ is a current of phase c, R is the electric motor resistance, $V_{ce}$ is the conduction voltage drop of the built-in power transistor, Q is the single-switching loss per unit current of the built-in power transistor, F is the switching frequency of the built-in power transistor, and k is a constant determined according to a rotor position.

4. The method according to claim 1, wherein the measuring the actual copper loss power comprises:

measuring a current value and a voltage value input from an electric vehicle electronic control unit to the electric motor, and determining the actual copper loss power according to the current value and the voltage value.

5. The method according to claim 1, wherein the adjusting the phase difference of the three-phase pulses according to the actual copper loss power and the heating power to realize adjusting the phase of the three-phase pulses comprises:

calculating a difference between the actual copper loss power and the heating power, and looking up a corresponding phase difference in a second comparison table according to the difference between the actual copper loss power and the heating power, wherein the second comparison table comprises a correspondence between a difference between an actual copper loss power and a heating power and a phase difference;

adjusting the phase difference of the three-phase pulses using the corresponding phase difference, to realize adjusting the phase of the three-phase pulses.

6. An electronic device for an electric motor, comprising: a processor and a memory communicatively connected to the processor; wherein the memory stores computer execution instructions; and the processor executes the computer execution instructions stored in the memory; wherein the instructions, when executed by the processor, cause the processor to:

receive a heating instruction sent by a heat management system, wherein the heating instruction comprises a heating power;

determine a current value of each phase of three-phase pulses of the electric motor according to the heating power;

change a duty cycle of at least one phase of the three-phase pulses to increase a copper loss of the electric motor;

measure an actual copper loss power, and adjust a phase difference of the three-phase pulses according to the actual copper loss power and the heating power to realize adjusting a phase of the three-phase pulses, to increase an iron loss of the electric motor;

continuously detect a total loss power of the electric motor generated by the copper loss and the iron loss, determine a difference between the total loss power and the heating power, and adjust the phase difference of the three-phase pulses according to the difference between the total loss power and the heating power until the difference between the total loss power and the heating power is less than a preset value, to enable the electric motor to be actively heated;

wherein when adjusting the phase difference of the three-phase pulses, the processor is specifically configured to: adjust a phase of at least one phase of the three-phase pulses, to present the phase difference in the three-phase pulses.

7. The electronic device according to claim 6, wherein the instructions specifically cause the processor to:

determine the current value of each phase of the three-phase pulses of the electric motor according to an electric motor resistance, a conduction voltage drop of a built-in power transistor, a single-switching loss per unit current of the built-in power transistor, a switching frequency of the built-in power transistor and a current relationship of the three-phase pulses.

8. The electronic device according to claim 7, wherein a calculation formula for determining the current value of each phase of the three-phase pulses of the electric motor according to the electric motor resistance, the conduction voltage drop of the built-in power transistor, the single-switching loss per unit current of the built-in power transistor, the switching frequency of the built-in power transistor and the current relationship of the three-phase pulses is as follows:

$$P=\left(I_a^2+I_b^2+I_c^2\right)R+(I_a+I_b+I_c)V_{ce}+(I_a+I_b+I_c)Q\cdot F$$

-continued $$\text{wherein} - I_a = I_b + I_c,\ I_b = k \cdot I_c$$

in the formula, $I_a$ is a current of phase a, $I_b$ is a current of phase b, $I_c$ is a current of phase c, R is the electric motor resistance, $V_{ce}$ is the conduction voltage drop of the built-in power transistor, Q is the single-switching loss per unit current of the built-in power transistor, F is the switching frequency of the built-in power transistor, and k is a constant determined according to a rotor position.

9. The electronic device according to claim 6, wherein the instructions specifically cause the processor to:

measure a current value and a voltage value input from an electric vehicle electronic control unit to the electric motor, and determine the actual copper loss power according to the current value and the voltage value.

10. A non-transitory computer-readable storage medium, wherein the non-transitory computer-readable storage medium stores computer execution instructions, and when the computer execution instructions are executed by a processor, the following operations are implemented:

receiving a heating instruction sent by a heat management system, wherein the heating instruction comprises a heating power;

determining a current value of each phase of three-phase pulses of the electric motor according to the heating power;

changing a duty cycle of at least one phase of the three-phase pulses to increase a copper loss of the electric motor;

measuring an actual copper loss power, and adjusting a phase difference of the three-phase pulses according to the actual copper loss power and the heating power to realize adjusting a phase of the three-phase pulses, to increase an iron loss of the electric motor;

continuously detecting a total loss power of the electric motor generated by the copper loss and the iron loss, determining a difference between the total loss power and the heating power, and adjusting the phase difference of the three-phase pulses according to the difference between the total loss power and the heating power until the difference between the total loss power and the heating power is less than a preset value, to enable the electric motor to be actively heated;

wherein the adjusting the phase difference of the three-phase pulses comprises: adjusting a phase of at least one phase of the three-phase pulses, to present the phase difference in the three-phase pulses.

* * * * *